(12) United States Patent
Wang

(10) Patent No.: US 7,230,540 B2
(45) Date of Patent: Jun. 12, 2007

(54) LIQUID LEVEL ALARM

(76) Inventor: Huang-Lin Wang, No. 9, Nanjin 1st St., Fongshan City, Kaohsiung Hsien (TW)

( * ) Notice: Subject to any disclaimer, the term of this patent is extended or adjusted under 35 U.S.C. 154(b) by 205 days.

(21) Appl. No.: 11/178,468

(22) Filed: Jul. 12, 2005

(65) Prior Publication Data
US 2007/0013536 A1 Jan. 18, 2007

(51) Int. Cl.
*G08B 21/18* (2006.01)
*G01F 23/30* (2006.01)

(52) U.S. Cl. ........................... 340/623; 73/308

(58) Field of Classification Search ............... 340/623, 340/618, 624, 625; 73/305, 307, 317, 318, 73/319
See application file for complete search history.

(56) References Cited
U.S. PATENT DOCUMENTS
3,786,464 A * 1/1974 Staempfli .................... 340/623

5,176,552 A * 1/1993 Kuboyama et al. ........... 441/16
6,414,598 B2 * 7/2002 Freill et al. .................. 340/623
6,486,786 B2 * 11/2002 Chuang ....................... 340/623
6,558,216 B2 * 5/2003 Yerazunis et al. ............ 441/11

* cited by examiner

*Primary Examiner*—Charles D. Garber
*Assistant Examiner*—Kerri McNally
(74) *Attorney, Agent, or Firm*—Rabin & Berdo, P.C.

(57) ABSTRACT

A liquid level alarm is placed in a tank having a bottom and has a weight, a floating box, an alarm circuit and a cord. The weight is placed on the bottom of the tank. The floating box has a top recess, a passage, a slide and a top cover. The passage communicates with the top recess. The slide is mounted slidably in the passage. The alarm circuit is mounted in the top recess in the floating box and has two contacts, an alarm element, a switch and a spring. The switch is connected to the slide. The spring is connected to the top cover and holds the switch open. The cord is connected to the weight and the slide. When the floating box moves above a predetermined level, the switch with the slide moves down and makes contact with the contacts to activate the alarm element.

5 Claims, 5 Drawing Sheets

LIQUID LEVEL ALARM

BACKGROUND OF THE INVENTION

1. Field of the Invention

The present invention relates to an alarm, and more particularly to a liquid level alarm that detects a level of a liquid in a tank and alerts people when the liquid level exceeds a predicted limit. The liquid level alarm has a simple structure and a low cost.

2. Description of Related Art

Tanks for storage of liquid such as water or oil are used usually with level alarms to warn people when liquid levels in the tanks exceed predetermined limits by sounding an audible alarm or radiating a visual alarm. Many types of alarms for detecting liquid levels have been developed and are now available. However, most of those alarms have a complicated structure and a high cost.

To overcome the shortcomings, the present invention provides a liquid level alarm to mitigate or obviate the aforementioned problems.

SUMMARY OF THE INVENTION

The main objective of the invention is to provide a liquid level alarm that detects a level of a liquid in a tank and alerts people when the liquid level exceeds a predetermined limit. The liquid level alarm has a simple structure and a low cost.

A liquid level alarm in accordance with the present invention is placed in a tank having a bottom and comprises a weight, a floating box, an alarm circuit and a cord.

The weight is placed on the bottom of the tank.

The floating box has a top recess, a passage, a slide and a top cover. The passage communicates with the top recess. The slide is mounted slidably in the passage.

The alarm circuit is mounted in the top recess in the floating box and has two contacts, an alarm element, a switch and a spring. The switch is connected to the slide. The spring is connected to the top cover and prevents the switch from making contact with the contacts.

The cord is connected to the weight and the slide.

Other objectives, advantages and novel features of the invention will become more apparent from the following detailed description when taken in conjunction with the accompanying drawings.

DETAILED DESCRIPTION OF PREFERRED EMBODIMENT

Figure 1:
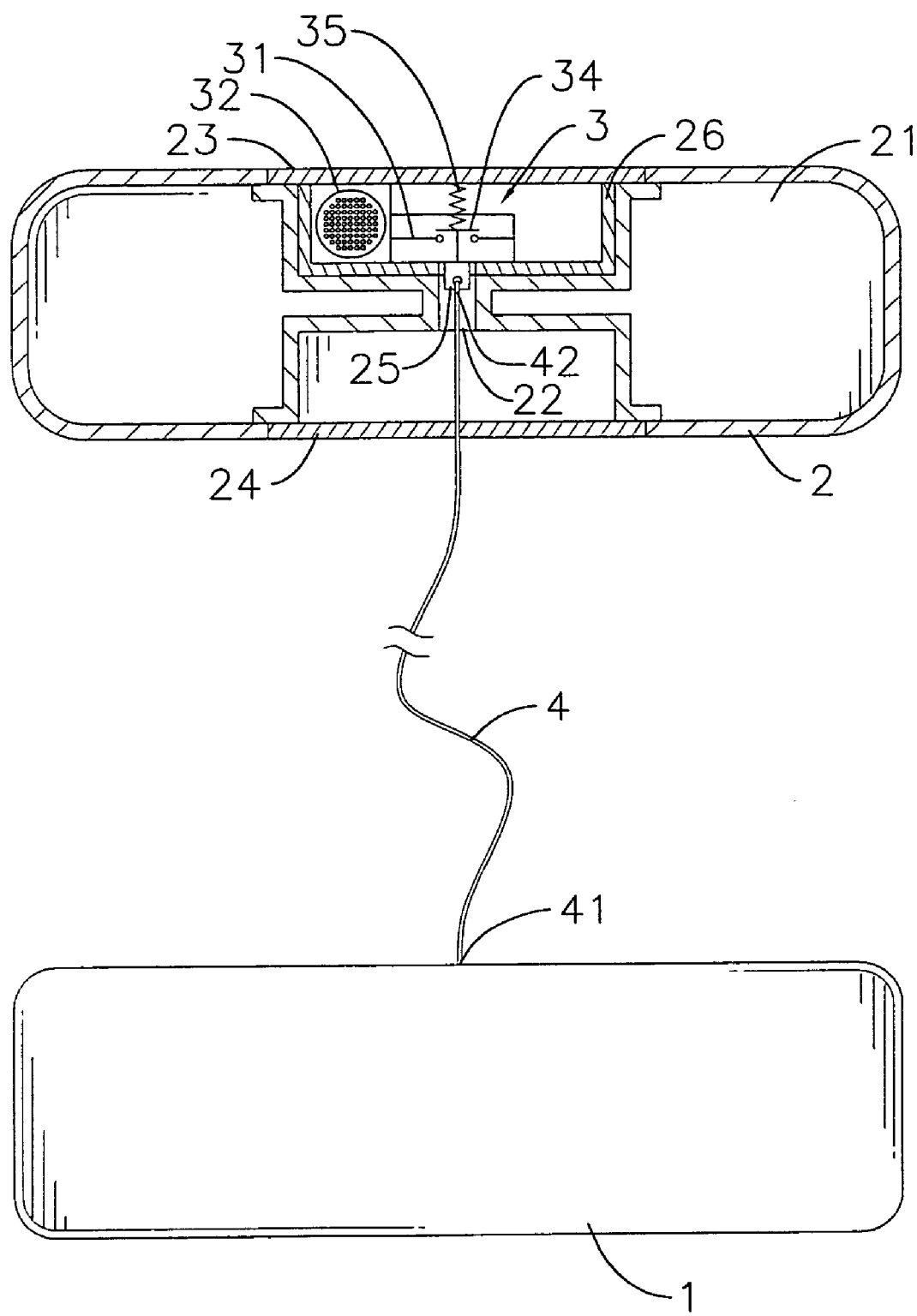
FIG. 1 is a front view in partial section of a first embodiment of a liquid level alarm in accordance with the present invention with a buzzer.
Figure 2:
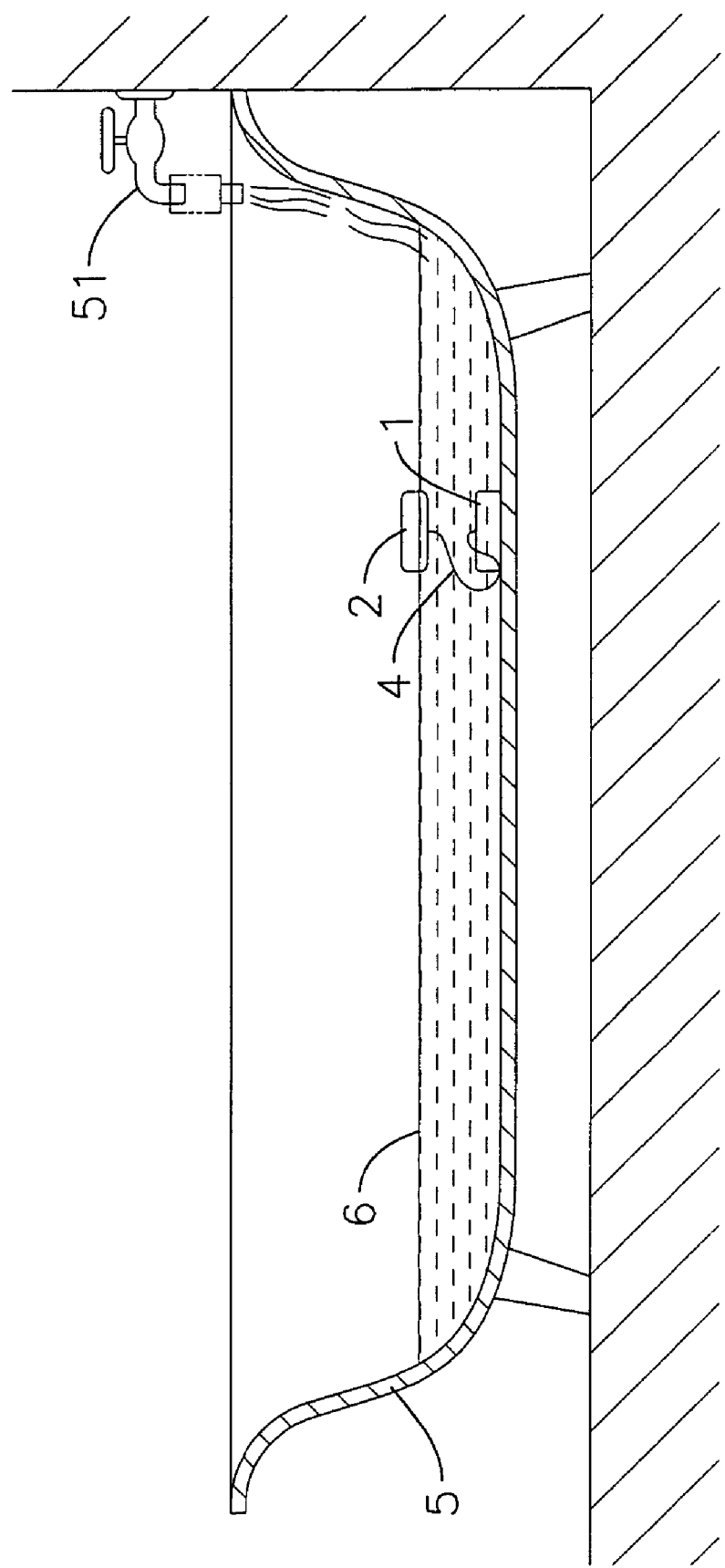
FIG. 2 is an operational side view in partial section of a tank with the liquid level alarm in FIG. 1 with a liquid level less than a predetermined limit.

With reference to FIGS. 1 and 2, a liquid level alarm in accordance with the present invention is placed in a liquid (6) such as water or oil stored in a tank (5). The tank (5) has a bottom and is used with a tap (51) mounted on a wall. The tap (51) can be opened to pour liquid (6) into the tank (5).

The liquid level alarm has a weight (1), a floating box (2), an alarm circuit (3) and a cord (4).

The weight (1) is placed on the bottom of the tank (5).

The floating box (2) is hollow and has a top, a bottom, a top recess, a bottom recess, a passage (22), at least one internal chamber (21), a top cover (23), a bottom cover (24), a slide (25) and a seal (26). The top recess is defined in the top and has an inner surface. The bottom recess is defined in the bottom. The passage (22) is defined vertically in the floating box (2) between the top recess and the bottom recess. The at least one internal chamber (21) is defined hermetically inside the floating box (2). The top cover (23) is mounted hermetically on the top and covers the top recess to make the floating box (2) buoyant. The bottom cover (24) is mounted over the bottom recess and has a through hole defined through the bottom cover (24). The slide (25) is mounted slidably in the passage (22). The seal (26) is mounted on the inner surface of the top recess.

Figure 5:
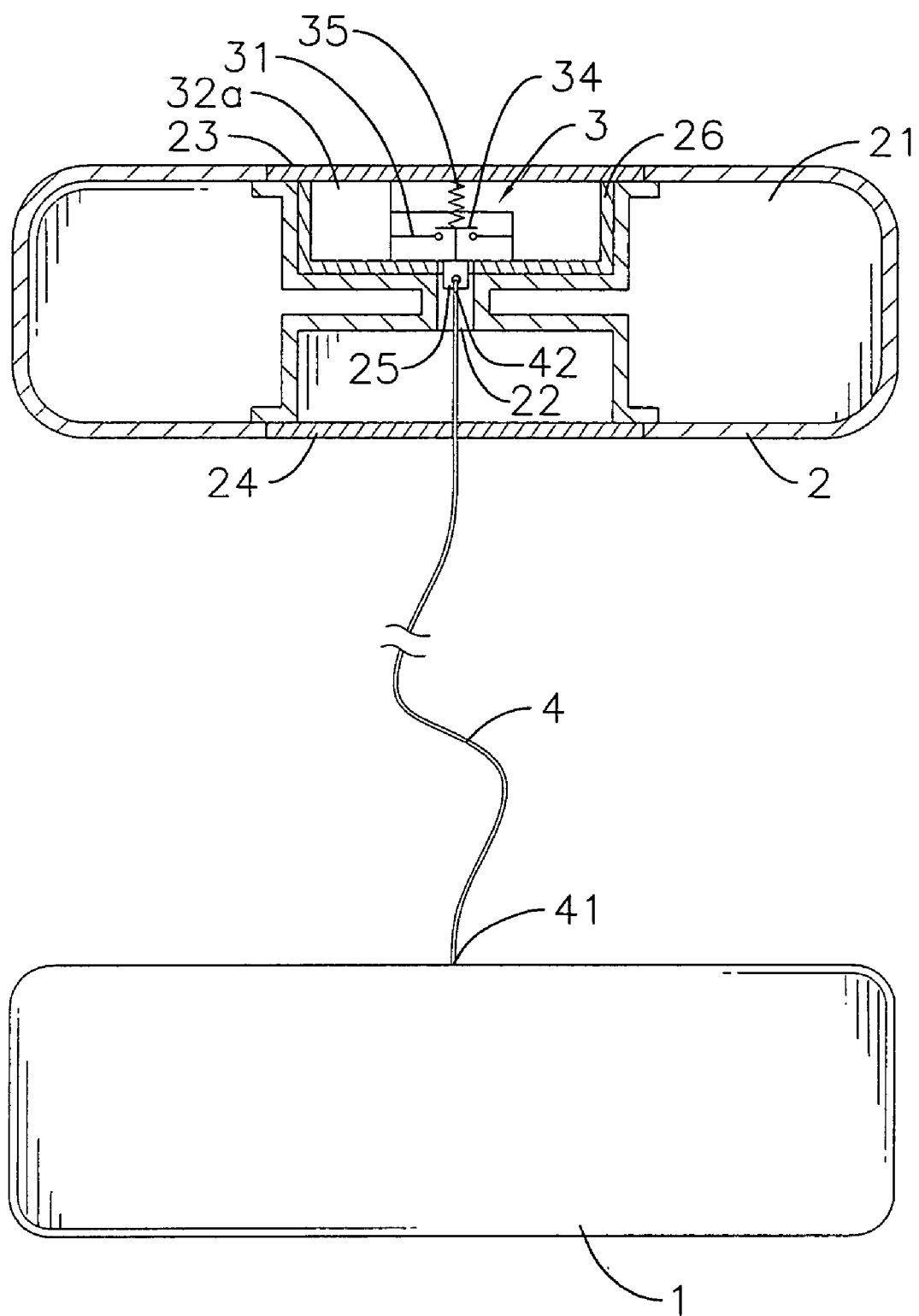
FIG. 5 is a front view in partial section of a second embodiment of the liquid level alarm in accordance with the present invention with a signal transmitter.

With further reference to FIG. 5, the alarm circuit (3) is mounted in the top recess in the floating box (2), is isolated by the seal (26), is connected to an external power source or a battery and has two contacts (31), an alarm element, a switch (34) and a spring (35). The alarm element may be a buzzer (32) or a signal transmitter (32a) that transmits radio signals to an external alarm such as a buzzer or a light, or a tap controller connected to the tap (51) when operating. The alarm element is connected to the contacts (31). The switch (34) is connected to the slide (25) in the passage (22) in the floating box (2) and selectively makes contact with the contacts (31) to activate the alarm element. The spring (35) is connected to the top cover (23) on the floating box (2) and the switch (34) and holds the switch (34) open.

Figure 3:
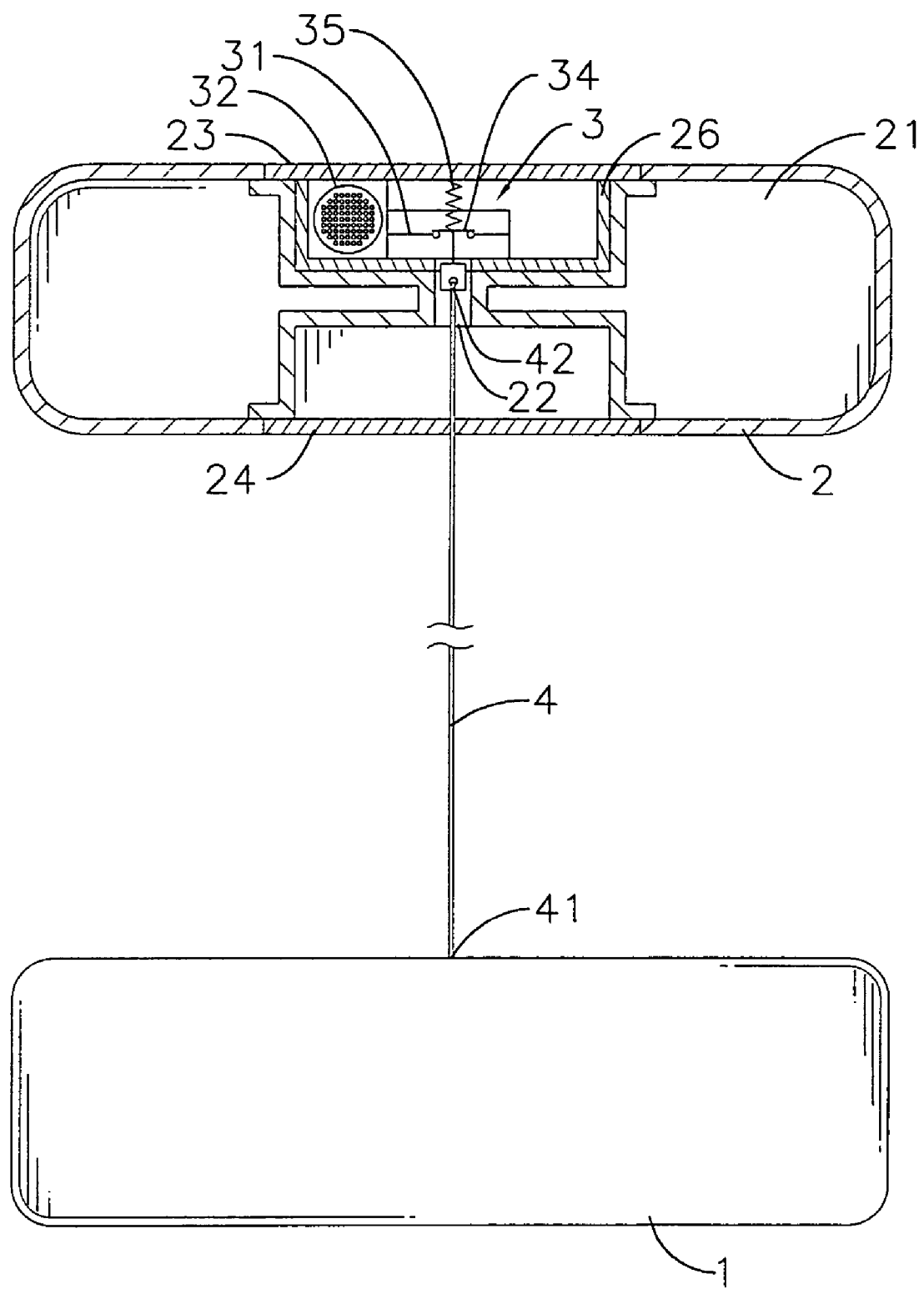
FIG. 3 is an operational front view in partial section of the liquid level alarm in FIG. 1 with the alert being triggered.
Figure 4:
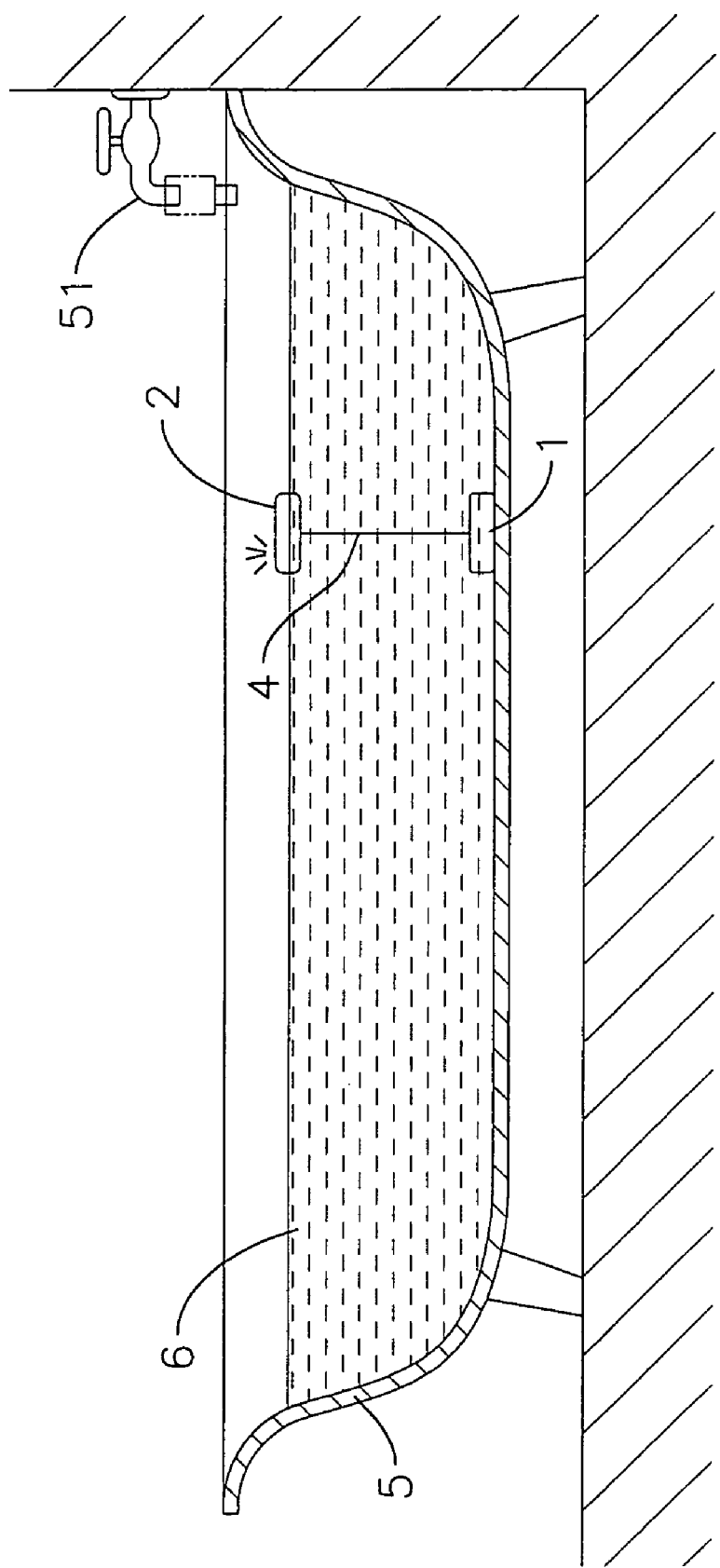
FIG. 4 is an operational side view in partial section of the tank with the liquid level alarm in FIG. 3 with the liquid level higher than the predetermined limit.

With further reference to FIGS. 3 and 4, the cord (4) has a bottom end (41) and a top end (42). The bottom end (41) is connected to the weight (1). The top end (42) extends through the through hole in the bottom cover (24) and the bottom recess in the floating box (22) and is connected to the slide (25). When the liquid level in the tank (5) rises beyond a predetermined limit, the cord (4) pulls the slide (25) down until the switch (34) makes contact with the contacts (31). The alarm element activates and generates sound or transmits radio signals to the external alarm or the tap controller so that people or the tap controller can turn off the tap (51).

The structure of the liquid level alarm is simple. Furthermore, the elements such as the slide (25), the alarm element (32) and spring (35) are cheap so that the liquid level alarm has a low cost.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A liquid level alarm comprising:
a weight;
a floating box being hollow and having
- a top;
- a bottom;
- a top recess defined in the top and having an inner surface;
- a bottom recess defined in the bottom;
- a passage defined in the floating box between the top recess and the bottom recess;
- a top cover mounted hermetically on the top and covering the top recess;
- a bottom cover mounted over the bottom recess and having a through hole defined through the bottom cover; and
- a slide mounted slidably in the passage;

an alarm circuit mounted in the top recess in the floating box and having
- two contacts;
- an alarm element connected to the contacts;
- a switch connected to the slide in the passage in the floating box and selectively contacting the contacts to activate the alarm element; and
- a spring connected to the top cover on the floating box and the switch and supplying a resilient force to hold the switch open; and a cord having a bottom end connected to the weight and a top end extending through the through hole in the bottom cover and the bottom recess in the floating box and connected to the slide.

2. The liquid level alarm as claimed in claim 1, wherein the floating box further has at least one internal chamber defined hermetically inside the floating box.

3. The liquid level alarm as claimed in claim 2, wherein the floating box further has a seal mounted in the top recess, and the alarm circuit is isolated by the seal.

4. The liquid level alarm as claimed in claim 3, wherein the alarm element is a buzzer.

5. The liquid level alarm as claimed in claim 3, wherein the alarm element is a signal transmitter.

* * * * *